United States Patent
Yoshida et al.

(10) Patent No.: US 8,467,478 B2
(45) Date of Patent: Jun. 18, 2013

(54) PROPAGATION CHANNEL ESTIMATION APPARATUS, RECEIVER, AND PROPAGATION CHANNEL ESTIMATION METHOD

(75) Inventors: Makoto Yoshida, Kawasaki (JP);
Yasuharu Amezawa, Kawasaki (JP);
Kazuyuki Ozaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/075,331

(22) Filed: Mar. 30, 2011

(65) Prior Publication Data

US 2011/0176621 A1    Jul. 21, 2011

Related U.S. Application Data

(63) Continuation of application No. PCT/JP2008/067739, filed on Sep. 30, 2008.

(51) Int. Cl.
*H03K 9/00* (2006.01)
*H04L 27/00* (2006.01)
*H03D 1/06* (2006.01)

(52) U.S. Cl.
USPC ............ 375/316; 375/324; 375/346; 375/348

(58) Field of Classification Search
USPC ................ 375/130, 133, 135, 136, 142, 143, 375/144, 145, 146, 147, 219, 220, 222, 262, 375/229–236, 295, 316, 240.26–240.29, 375/259, 284, 285, 267, 299, 340, 341, 346, 375/347, 348, 350, 354, 358
See application file for complete search history.

(56) References Cited

U.S. PATENT DOCUMENTS

2007/0041432 A1 * 2/2007 Reial .............................. 375/148
2009/0168908 A1 * 7/2009 Lee et al. ....................... 375/260

FOREIGN PATENT DOCUMENTS

| EP | 1845628 A1 * | 10/2007 |
|---|---|---|
| JP | 5-308252 | 11/1993 |
| JP | 11-313013 | 11/1999 |
| JP | 2001-148640 | 5/2001 |
| JP | 2002-261658 | 9/2002 |
| JP | 2002-353857 | 12/2002 |

(Continued)

OTHER PUBLICATIONS

International Search Report dated Jan. 13, 2009, from the corresponding International Application.

(Continued)

*Primary Examiner* — Sam K Ahn
*Assistant Examiner* — Linda Wong
(74) *Attorney, Agent, or Firm* — Katten Muchin Rosenman LLP

(57) ABSTRACT

An apparatus includes a selection unit that selects an estimation target path to be used to estimate a propagation channel estimation value, among a plurality of paths based on a characteristic value of each path; a determination unit that determines an estimated reception time at which a signal as a target of estimation of the propagation channel estimation value among signals propagating through the estimation target path is received; an estimation unit that estimates an amplitude and a phase of the signal propagating through the estimation target path at the estimated reception time as a propagation channel estimation value of the estimation target path; and a processing unit that performs an interpolation/extrapolation process using the propagation channel estimation value of the estimation target path to estimate the propagation channel estimation value at a time other than the estimated reception time of the signal propagating through the estimation target path.

12 Claims, 10 Drawing Sheets

FOREIGN PATENT DOCUMENTS

| | | |
|---|---|---|
| JP | 2003-115786 | 4/2003 |
| JP | 2003-333008 | 11/2003 |
| JP | 2005-51404 | 2/2005 |
| JP | 2007-336317 | 12/2007 |
| JP | 2008-141279 | 6/2008 |

OTHER PUBLICATIONS

Notice of Rejection dated Sep. 4, 2012, from corresponding Japanese Application No. 2010-531667.

* cited by examiner

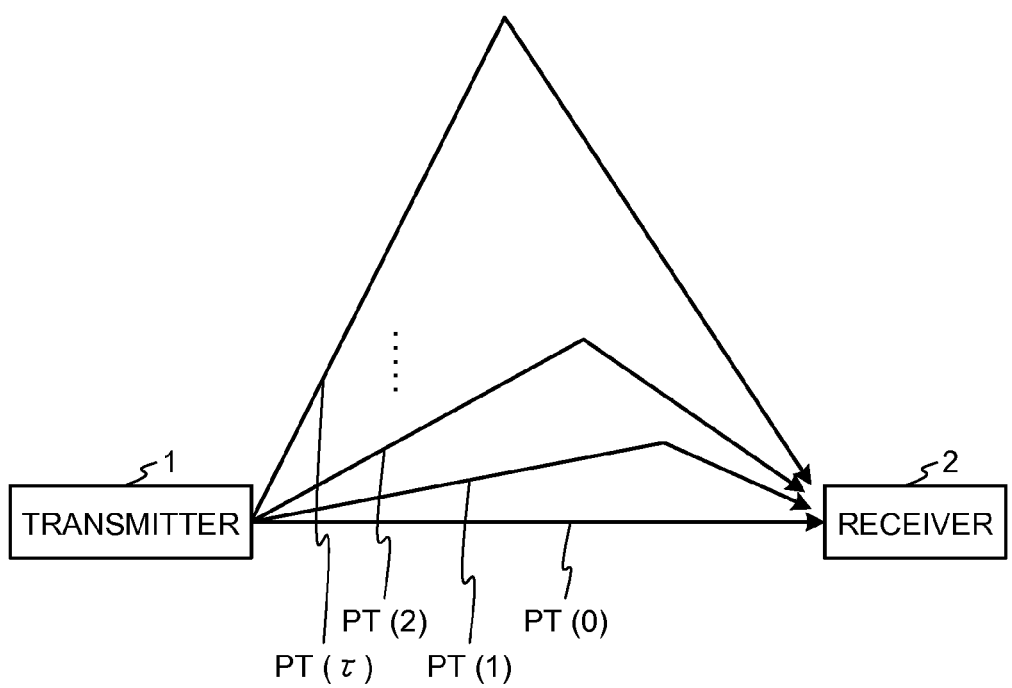
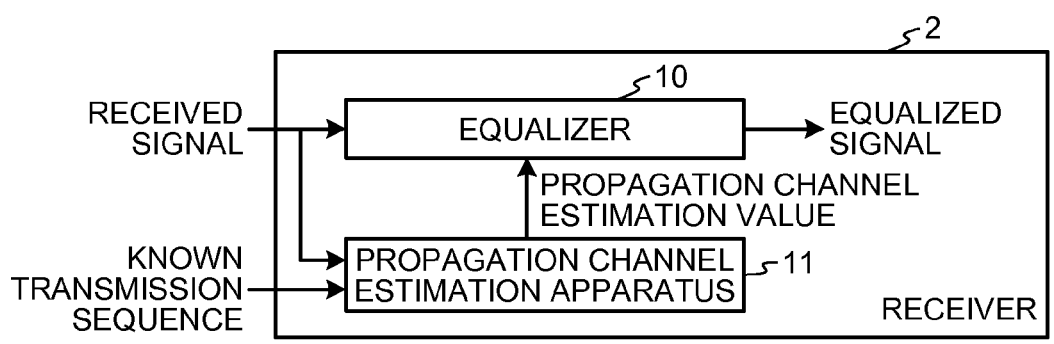

PROPAGATION CHANNEL ESTIMATION APPARATUS, RECEIVER, AND PROPAGATION CHANNEL ESTIMATION METHOD

CROSS-REFERENCE TO RELATED APPLICATION

This application is a continuation of International Application No. PCT/JP2008/067739, filed on Sep. 30, 2008, the entire contents of which are incorporated herein by reference.

FIELD

The embodiments discussed herein are directed to a propagation channel estimation apparatus, a receiver, and a propagation channel estimation method.

BACKGROUND

Conventionally, in a mobile communication system, a state of a propagation channel (path) between a transmitter and a receiver is accurately estimated, and a received signal of the receiver is equalized by using a propagation channel estimation value as a result of estimation, so that the signal is compensated for the distortion occurred in the propagation channel. In addition, in the case where a change in the propagation channel is slow at the time of estimating the propagation channel estimation value (for example, in the case where the communication method of the mobile communication system is an orthogonal frequency division multiplexing (OFDM) method, the receiver performs calculation under the assumption that the propagation channel estimation value of each of the sample signals in one symbol is constant.

A conventional propagation channel estimation method will be described. A transmitted signal of the time t is denoted by x(t); a noise is denoted by n(t); and the propagation channel estimation value of a delay time τ of the time t is denoted by h(τ, t). In this case, the received signal y(t) of the time t can be expressed by the following equation.

$$y(t) = h(\tau, t) \otimes x(t) + n(t) \quad (1)$$

where $\otimes$ denotes convolution operation. Therefore, in a communication using a spectrum spread method, the propagation channel estimation value is estimated by the following equation.

$$\hat{h}(\tau, t+T/2) = \sum_{t=0}^{T-1} y(t)\hat{x}^*(t-\tau) \quad (2)$$

where $\hat{x}^*(t)$ denotes a complex conjugate of a known transmitted signal replica x(t), and T denotes the number of samples included in one symbol. In addition, in a communication using the OFDM method, the propagation channel estimation value is estimated by the following equation.

$$\hat{h}(c, t+T/2) = FFT[y]/FFT[\hat{x}] \quad (3)$$

where c denotes a subcarrier, and y denotes a sequence from a time sequence y(t) corresponding to one symbol to a time sequence y(t+T−1). As expressed in the above Equations (2) and (3), in a conventional propagation channel estimation method, in the case of the signals corresponding to the T sample signals from y(t) to y(t+T−1), the propagation channel estimation value of the time t+T/2 is estimated, and the propagation channel estimation value is used as the constant value of each of the samples in one symbol.

However, recently, since the frequency band of the mobile communication system is heightened, influence of a frequency error between the transmitter and the receiver and Doppler shift associated with movement of the transmitter and the receiver becomes notable, so that a change in the propagation channel is fast.

However, in the conventional propagation channel estimation method, since the propagation channel estimation value at the time t+T/2 of the center of one symbol, that is, T sample signals are used as the constant value in one symbol, in the case where the propagation channel is changed within one symbol, that is, within the T sample signals, due to the fast change in the propagation channel, an accurate propagation channel estimation value cannot be obtained. Therefore, the received signal cannot be accurately equalized.

Under such circumstances, various technologies using an adaptive algorithm capable of adaptively updating the propagation channel estimation value even in an environment of the propagation channel of which a change is fast have been considered.

As such types of the technologies, there are technologies of performing threshold value determination on tap coefficients (corresponding to a propagation channel estimation value) after correction (updating) according to an adaptive algorithm to remove tap coefficients corresponding to noise and performing equalization of a received signal by using only the remaining tap coefficients (for example, refer to Japanese Laid-open Patent Publication Nos. 11-313013, 2005-51404, and 2005-51404) and technologies of performing threshold value determination on an equalized signal by using tap coefficients after updating according to an adaptive algorithm (for example, refer to Japanese Laid-open Patent Publication No. 05-308252)

However, in all the conventional technologies disclosed in Japanese Laid-open Patent Publication Nos. 11-313013, 2005-51404, 2005-51404, and 05-308252, all the signals propagating through a plurality of propagation channels between the transmitter and the receiver are input to the adaptive algorithm, and the propagation channel estimation values for all the propagation channels are calculated through calculation of the adaptive algorithm. Therefore, the calculation amount of the adaptive algorithm is very large, so that a speed of calculation of the propagation channel estimation values is delayed.

In addition, after the threshold value determination is performed on the tap coefficients after the updating according to the adaptive algorithm, the propagation channel estimation value corresponding to the tap coefficients each of which is equal to or smaller than the threshold value, that is, the noise component is forcibly set to zero, so that the accuracy of calculation of the propagation channel estimation value is decreased.

SUMMARY

According to an aspect of an embodiment of the invention, a propagation channel estimation apparatus is used for a receiver that receives a signal transmitted from a transmitter through a plurality of paths. The propagation channel estimation apparatus includes a path selection unit that selects an estimation target path, which is a path to be used to estimate a propagation channel estimation value, among the plurality of paths based on a predetermined characteristic value of each path; an estimated reception time determination unit that determines an estimated reception time that is a time at which a signal as a target of estimation of the propagation channel estimation value among signals propagating through the estimation target path is received; an amplitude phase estimation unit that estimates an amplitude and a phase of the signal propagating through the estimation target path at the estimated reception time as a propagation channel estimation value of the estimation target path; and an interpolation/extrapolation processing unit that performs an interpolation/extrapolation process using the propagation channel estimation value of the estimation target path to estimate the propagation channel estimation value at a time other than the estimated reception time of the signal propagating through the estimation target path.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 1 is a block diagram illustrating a configuration of a radio communication system having a propagation channel estimation apparatus according to an embodiment;

FIG. 2 is a block diagram illustrating a configuration of a receiver illustrated in FIG. 1;

DESCRIPTION OF EMBODIMENTS

Figure 3:
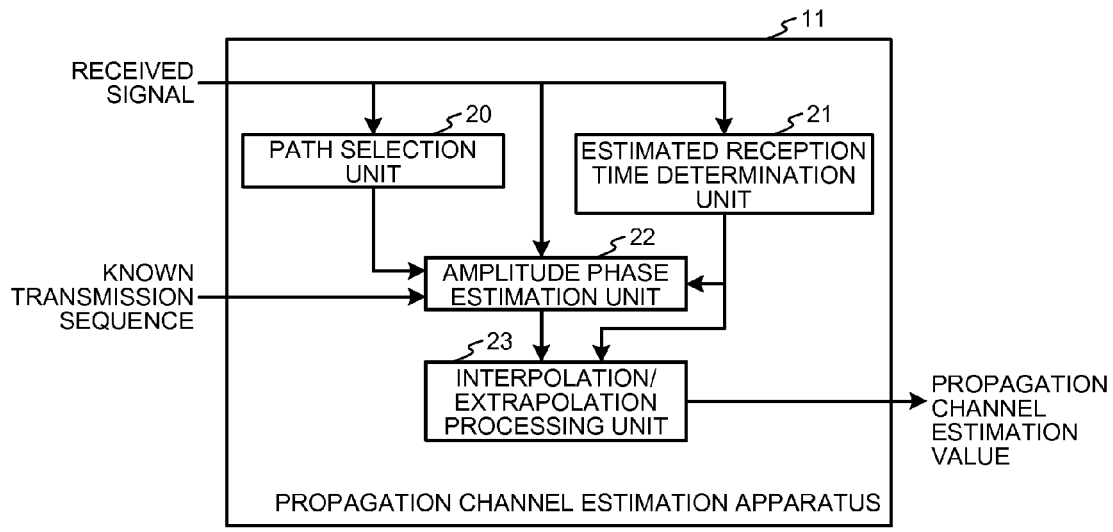
FIG. 3 is a block diagram illustrating a configuration of a propagation channel estimation apparatus illustrated in FIG. 2.

Preferred embodiments of the present invention will be explained with reference to accompanying drawings.

FIG. 1 is a block diagram illustrating a configuration of a radio communication system having a propagation channel estimation apparatus according to an embodiment of the invention. As illustrated in FIG. 1, the radio communication system includes a transmitter 1 and a receiver 2. The transmitter 1 transmits a signal to the receiver 2.

A signal transmitted from the transmitter 1 propagates through a plurality of propagation channels (paths) $PT(0)$ to $PT(\tau)$ to be received by the receiver 2. In addition, $\tau$ denotes a delay time of the signal in each path PT. FIG. 1 illustrates that a signal propagating through the paths is delayed in the order of the path $PT(0)$, the path $PT(1)$, the path $PT(2)$, . . . , and the path $(\tau)$.

When the signal transmitted from the transmitter 1 propagates through the paths $PT(0)$ to $PT(\tau)$, the signal is affected by a frequency error between the transmitter 1 and the receiver 2 and by Doppler shift associated with movements of the transmitter 1 and the receiver 2, or the like. Therefore, the propagating signal in each of the paths $PT(0)$ to $PT(\tau)$ becomes a signal having a change (distortion).

The receiver 2 receives the signal transmitted from the transmitter 1 through a plurality of the paths $PT(0)$ to $PT(\tau)$. The signal received by the receiver 2 becomes a signal having the aforementioned change.

FIG. 2 is a block diagram illustrating the configuration of the receiver 2 illustrated in FIG. 1. As illustrated in FIG. 2, the receiver 2 includes an equalizer 10 and a propagation channel estimation apparatus 11. In addition, in FIG. 2, the illustration and description of the configuration that is not relevant to the propagation channel estimation apparatus 11 according to the embodiment are omitted.

The propagation channel estimation apparatus 11 estimates a propagation channel estimation value indicating the distortion of the signal propagating through each of the paths $PT(0)$ to $PT(\tau)$ from the signal (received signal) received through the paths $PT(0)$ to $PT(\tau)$ and a known transmission sequence.

The equalizer 10 performs an equalization process of removing the distortion from the received signal by using the propagation channel estimation value estimated by the propagation channel estimation apparatus 11. The signal (equalized signal) where the distortion is removed through the equalization process is transferred to a demodulation processing unit (not illustrated) to be demodulated to an original transmitted signal.

Herein, since the propagation channel estimation value estimated by the propagation channel estimation apparatus 11 is used for the equalization process of the equalizer 10, if the estimation accuracy of the propagation channel estimation value in the propagation channel estimation apparatus 11 is decreased, the signal characteristics of the equalized signal output from the equalizer 10 are deteriorated.

Therefore, in order to improve the estimation accuracy of the propagation channel estimation value, the propagation channel estimation apparatus 11 according to the embodiment selects a path for estimating the propagation channel estimation value in advance from a plurality of the paths $PT(0)$ to $PT(\tau)$ to calculate the propagation channel estimation value of the path and performs the interpolation/extrapolation process by using the calculation result.

Next, a configuration of the propagation channel estimation apparatus 11 according to the embodiment is described in detail with reference to FIG. 3. FIG. 3 is a block diagram illustrating a configuration of the propagation channel estimation apparatus 11 illustrated in FIG. 2. As illustrated in FIG. 3, the propagation channel estimation apparatus 11 includes a path selection unit 20, an estimated reception time determination unit 21, an amplitude phase estimation unit 22, and an interpolation/extrapolation processing unit 23.

The path selection unit 20 calculates the path characteristic value representing the characteristics of the path, from the received signal for each path, and selects an estimation target path, which is the path for estimation of the propagation channel estimation value, among a plurality of the paths PT(0) to PT(τ) based on the path characteristic value for each path. Information on the estimation target path selected by the path selection unit 20 is notified to the amplitude phase estimation unit 22. In addition, a detailed configuration of the path selection unit 20 selecting the estimation target path is separately described in detail.

The estimated reception time determination unit 21 determines an estimated reception time which is the time when the signal serving as a target of estimation of the propagation channel estimation value among the signals propagating through the estimation target path is to be received. Information on the estimated reception time determined by the estimated reception time determination unit 21 is notified to the amplitude phase estimation unit 22.

The amplitude phase estimation unit 22 estimates the amplitude and phase of the signal, which propagates through the estimation target path selected by the path selection unit 20, at the estimated reception time determined by the estimated reception time determination unit 21 as a propagation channel estimation value of the estimation target path. More specifically, the amplitude phase estimation unit 22 estimates the propagation channel estimation value of the estimation target path by using the received signal, the known transmission sequence, an output of the path selection unit 20, and an output of the estimated reception time determination unit 21. The propagation channel estimation value of the estimation target path estimated by the amplitude phase estimation unit 22 is transferred to the interpolation/extrapolation processing unit 23.

The interpolation/extrapolation processing unit 23 estimates the propagation channel estimation value at a time other than the estimated reception time of the signal propagating through the estimation target path by performing the interpolation/extrapolation process by using the propagation channel estimation value of the estimation target path. The propagation channel estimation value estimated by the interpolation/extrapolation processing unit 23 is transmitted to the equalizer 10 illustrated in FIG. 2 to be used for the equalization process.

Figure 4:
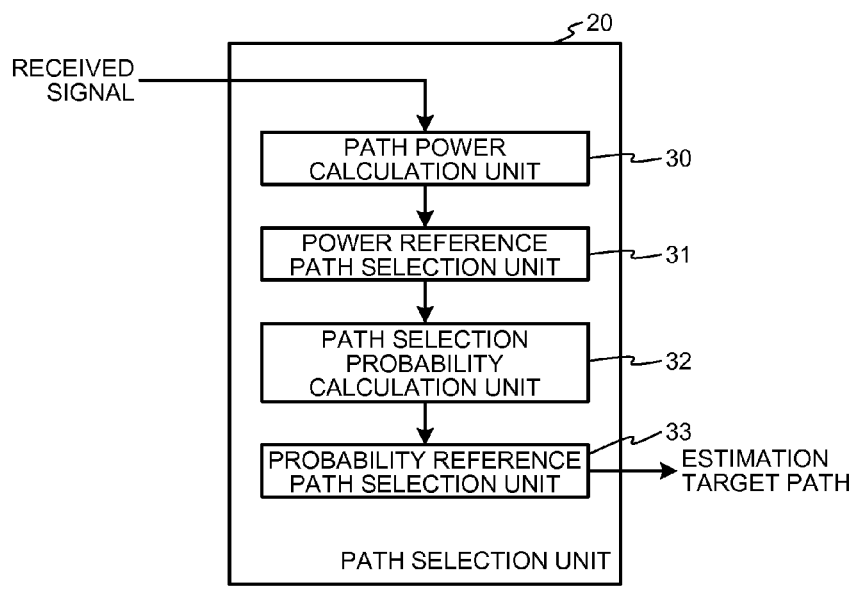
FIG. 4 is a block diagram illustrating a configuration of a path selection unit illustrated in FIG. 3.

Next, a configuration of the path selection unit 20 is illustrated in FIG. 3 is described with reference to FIG. 4. FIG. 4 is a block diagram illustrating the configuration of the path selection unit 20 illustrated in FIG. 3. As illustrated in FIG. 4, the path selection unit 20 includes a path power calculation unit 30, a power reference path selection unit 31, a path selection probability calculation unit 32, and a probability reference path selection unit 33.

The path power calculation unit 30 calculates the power in each path from the received signal as a path characteristic value.

The power reference path selection unit 31 compares the power in each path calculated by the path power calculation unit 30 with a predetermined threshold value to select an effective power path, that is, the path, in which the power is equal to or larger than the predetermined threshold value, among a plurality of the paths PT(0) to PT(τ).

The path selection probability calculation unit 32 calculates a probability of the case where each path is to be selected as an effective power path by the power reference path selection unit 31 as a path characteristic value.

More specifically, a probability value in the current symbol of a signal propagating through a path is denoted by $P_N$; a probability value in the one-preceding symbol of a signal propagating through a path is denoted by $P_{N-1}$; and a forgetting factor is denoted by $\mu$ ($0<\mu<1$). In this case, the probability P of the case where each path is to be selected as an effective power path by the power reference path selection unit 31 is expressed by $P=\mu P_{N-1}+(1-\mu)P_N$. Herein, in the case where a path is selected as an effective power path by the power reference path selection unit 31, the probability value $P_N$ is set to "1", and in the case where a path is not selected as an effective power path, the probability value $P_N$ is set to "0". The probability value $P_{N-1}$ is set to a calculation value of the probability P in the one-preceding symbol.

For example, in the case where the forgetting factor $\mu=0.3$, the path up to the one-preceding symbol is selected as an effective power path by the power reference path selection unit 31, and the path in the current symbol is not selected as an effective power path by the power reference path selection unit 31 (that is, in the case of $P_{N-1}=1$ and $P_N=0$), the probability $P=0.3\times1+0.7\times0=0.3$. In addition, in the case where the path in the one-following symbol is selected again as an effective power path by (that is, in the case of $P_N=1$), the probability $P=0.3\times0.3+0.7\times1=0.79$. In this manner, by taking into consideration the probability of the case where the path up to the one-preceding symbol is selected as an effective power path by the power reference path selection unit 31, the probability of the case where the path in the current symbol is not selected as an effective power path by the power reference path selection unit 31 is accumulatively calculated.

The probability reference path selection unit 33 compares the probability calculated for each path by the path selection probability calculation unit 32 with a predetermined threshold value to select the path, of which the probability calculated by the path selection probability calculation unit 32 is equal to or larger than the predetermined threshold value, as an estimation target path.

Figure 5:
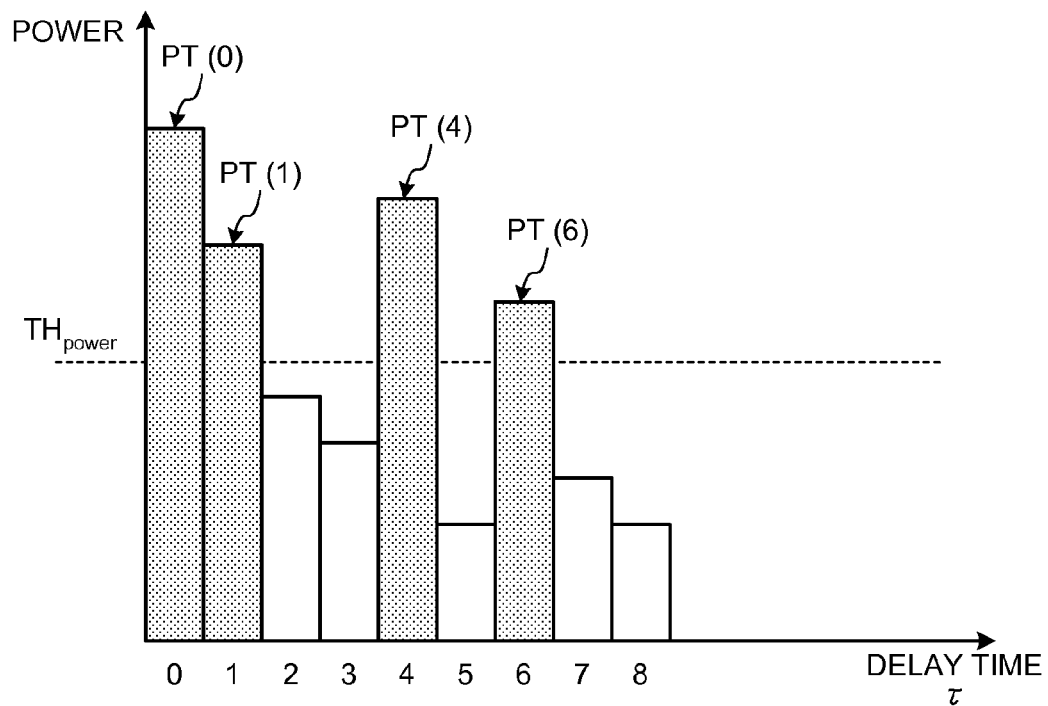
FIG. 5 is a view for explaining selection of an estimation target path based on a power.
Figure 6:
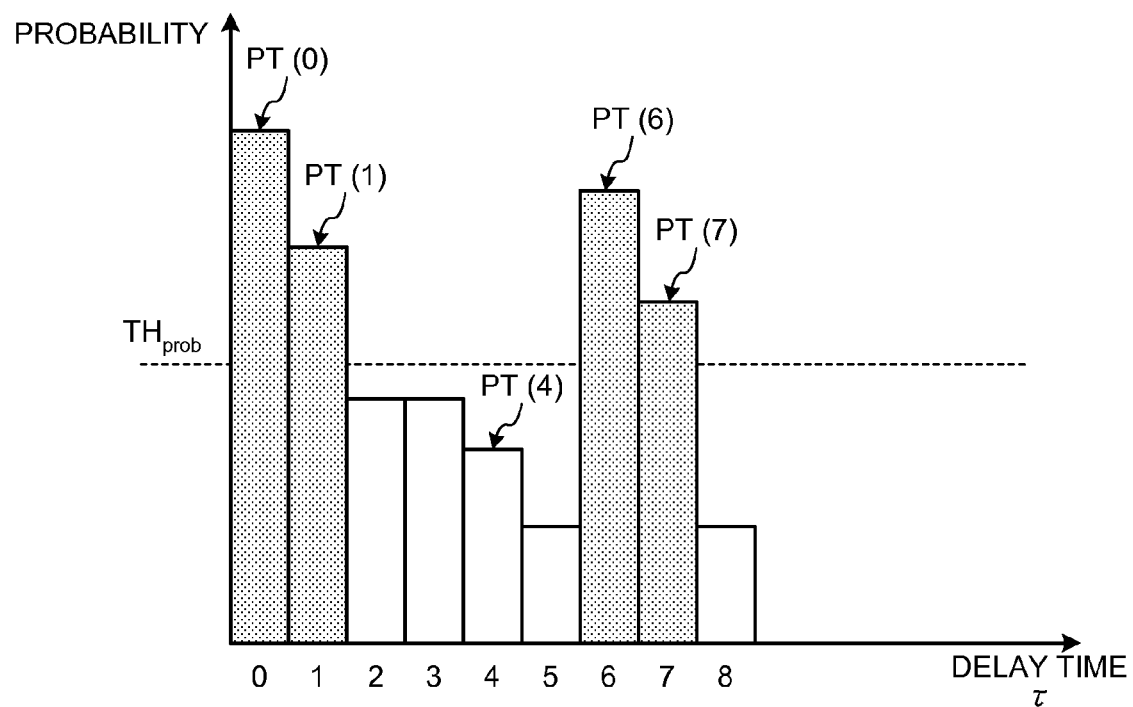
FIG. 6 is a view for explaining selection of an estimation target path based on a probability.

Herein, a procedure of performing selection of an estimation target path in the path selection unit 20 is described with reference to FIGS. 5 and 6. FIG. 5 is a view for explaining selection of an estimation target path based on a power, and FIG. 6 is a view for explaining selection of an estimation target path based on a probability. In addition, in FIGS. 5 and 6, as an example, a case where nine paths PT(0) to PT(8) (delay time τ=0 to 8) exist between the transmitter 1 and the receiver 2 illustrated in FIG. 1 is described.

As illustrated in FIG. 5, first, the path power calculation unit 30 calculates the power in each of the nine paths PT(0) to PT(8), that is, the power at each of the delay times 0 to 8.

In addition, the power reference path selection unit 31 compares the power in each of the nine paths PT(0) to PT(8) with a predetermined threshold value $TH_{power}$ to select the effective power path, which is the path of which the power calculated by the path power calculation unit 30 is equal to or larger than the predetermined threshold value $TH_{power}$, among the nine paths PT(0) to PT(8).

In the example illustrated in FIG. 5, since the power in each of the paths PT(0), PT(1), PT(4), and PT(6) is equal to or larger than the predetermined threshold value $TH_{power}$, the paths PT(0), PT(1), PT(4), and PT(6) as effective power paths. Information on the effective power paths selected by the power reference path selection unit 31 is output to the probability reference path selection unit 33.

Subsequently, as illustrated in FIG. 6, the path selection probability calculation unit 32 calculates a probability (hereinafter, referred to as a "probability") of each of the nine paths PT(0) to PT(8) selected as the effective power paths by the power reference path selection unit 31.

In addition, the probability reference path selection unit 33 compares the probability of each of the nine paths PT(0) to PT(8) with a predetermined threshold value $TH_{prob}$ to select the path, of which the probability calculated by the path selection probability calculation unit 32 is equal to or larger than the predetermined threshold value $TH_{prob}$, as an estimation target path.

In the example illustrated in FIG. 6, the paths PT(0), PT(1), PT(6), and PT(7), each of which the probability calculated by the path selection probability calculation unit 32 is equal to or larger than the predetermined threshold value $TH_{prob}$ are selected as estimation target paths.

The probability reference path selection unit 33 outputs information on the estimation target path selected by the probability reference path selection unit 33 to the amplitude phase estimation unit 22 illustrated in FIG. 3. In other words, the paths selected among the nine paths PT(0) to PT(8) by the probability reference path selection unit 33 are finally output as estimation target paths to the amplitude phase estimation unit 22.

In addition, the path PT(4) is selected by the power reference path selection unit 31 but is not selected by the probability reference path selection unit 33. Therefore, the path PT(4) is not treated as an estimation target path, so that the path PT(4) is not output to the amplitude phase estimation unit 22.

In this manner, in the embodiment, the estimation target path is selected by the path selection unit 20, so that a path having a low probability is not output to the amplitude phase estimation unit 22. Therefore, it is possible to decrease the number of signals input to an adaptive algorithm estimation unit 522, which will be described below, of the amplitude phase estimation unit 22, so that it is possible to reduce the calculation amount of the amplitude phase estimation unit 22.

In addition, the path selection unit 20 may not be provided with the path selection probability calculation unit 32 and the probability reference path selection unit 33. In this case, the power reference path selection unit 31 selects the path, of which the power calculated by the path power calculation unit 30 is equal to or larger than the predetermined threshold value, among a plurality of the paths as an estimation target path and outputs the estimation target path to the amplitude phase estimation unit 22.

Figure 7:
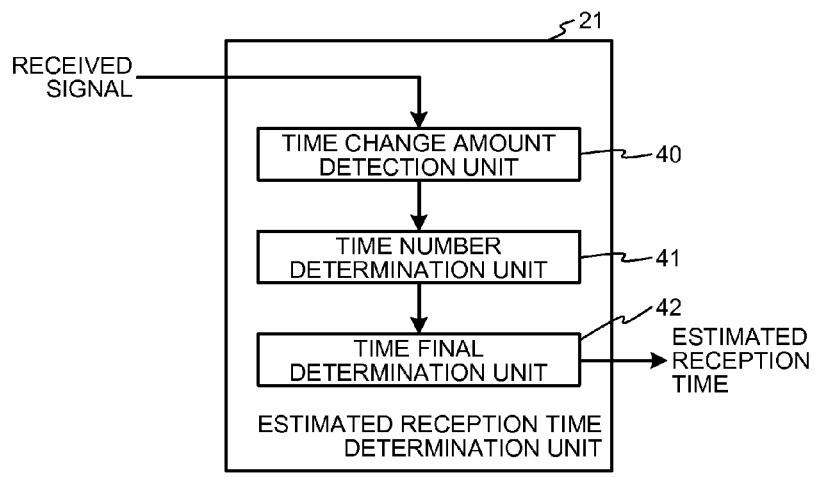
FIG. 7 is a block diagram illustrating a configuration of an estimated reception time determination unit illustrated in FIG. 3.

Next, a configuration the estimated reception time determination unit 21 illustrated in FIG. 3 is described with reference to FIG. 7. FIG. 7 is a block diagram illustrating the configuration of the estimated reception time determination unit 21 illustrated in FIG. 3. As illustrated in FIG. 7, the estimated reception time determination unit 21 includes a time change amount detection unit 40, a time number determination unit 41, and a time final determination unit 42.

The time change amount detection unit 40 detects a time change amount between the propagation channel estimation value of each sample signal included in the previous symbol of the signal propagating through the estimation target path and the propagation channel estimation value of each sample signal included in the current symbol.

The time number determination unit 41 determines the number of estimated reception times, which is the time when the signal as a target of estimation of the propagation channel estimation value is to be received, according to a size of the time change amount detected by the time change amount detection unit 40. More specifically, as the time change amount gets increased, the time number determination unit 41 determines the increased number of estimated reception times.

The time final determination unit 42 determines the estimated reception time in the current symbol of the signal propagating through the estimation target path by the number of estimated reception times determined by the time number determination unit 41. In addition, the time final determination unit 42 outputs the determined estimated reception time to the amplitude phase estimation unit 22 and the interpolation/extrapolation processing unit 23.

For example, in the case where the number of estimated reception times determined by the time number determination unit 41 is one, the time final determination unit 42 determines a time at the center of the current symbol of the signal propagating through the estimation target path as an estimated reception time. Therefore, in the case where the number of sample signals included in the current symbol of the signal propagating through the estimation target path is T, the time final determination unit 42 determines the time $t=(T-1)/2$ as an estimated reception time.

In addition, in the case where the number of estimated reception times determined by the time number determination unit 41 is two, the time final determination unit 42 determines times at the front and rear ends of the current symbol of the signal propagating through the estimation target path as an estimated reception time. Therefore, in the case where the number of sample signals included in the current symbol of the signal propagating through the estimation target path is T, the time final determination unit 42 determines the time $t=0$ and the time $t=T-1$ as an estimated reception time.

Figure 8:
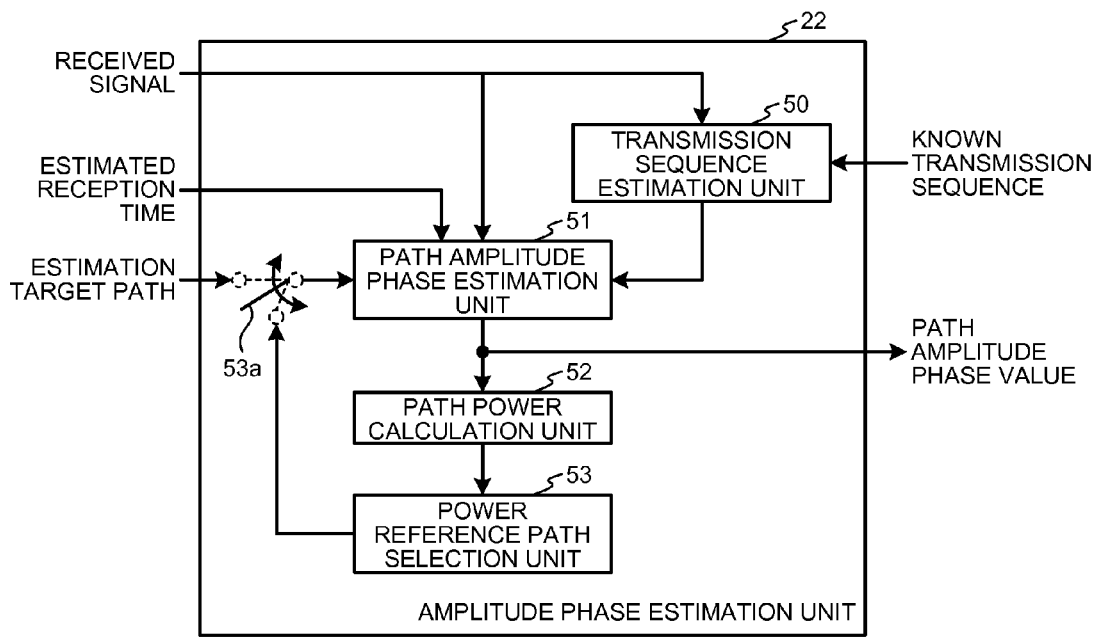
FIG. 8 is a block diagram illustrating a configuration of an amplitude phase estimation unit illustrated in FIG. 3.

Next, a configuration of the amplitude phase estimation unit 22 illustrated in FIG. 3 is described with reference to FIG. 8. FIG. 8 is a block diagram illustrating a configuration of the amplitude phase estimation unit 22 illustrated in FIG. 3. As illustrated in FIG. 8, the amplitude phase estimation unit 22 includes a transmission sequence estimation unit 50, a path amplitude phase estimation unit 51, a path power calculation unit 52, and a power reference path selection unit 53.

The transmission sequence estimation unit 50 estimates a transmitted signal by using the received signal and the known transmission sequence.

The path amplitude phase estimation unit 51 estimates the amplitude and phase of the signal propagating through the estimation target path selected by the path selection unit 20 at the estimated reception time determined by the estimated reception time determination unit 21 by using the received signal and the transmitted signal (hereinafter, referred to as an "estimated transmission sequence") estimated by the transmission sequence estimation unit 50. For example, as described above with reference to FIGS. 5 and 6, in the case where the paths PT(0), PT(1), PT(6), and PT(7) are selected as estimation target paths among the nine paths PT(0) to PT(8), the amplitudes and phases at the estimated reception times of the paths PT(0), PT(1), PT(6), and PT(7) are estimated.

The path power calculation unit 52 calculates the power of each estimation target path from the output of the path amplitude phase estimation unit 51.

The power reference path selection unit 53 compares the power of each estimation target path calculated by the path power calculation unit 52 with a predetermined threshold value to select the path, of which the power is equal to or larger than the predetermined threshold value, as a new estimation target path among the estimation target paths selected by the path selection unit 20. In addition, the power reference path selection unit 53 turns a switch 53a on so that information on the newly-selected estimation target path returns to the path amplitude phase estimation unit 51. Therefore, the number of estimation target paths selected by the path selection unit 20 is further decreased.

The path amplitude phase estimation unit 51 estimates the amplitude and phase of the signal propagating through the estimation target path selected by the power reference path selection unit 53 at the estimated reception time again by using the received signal and the transmitted signal estimated by the transmission sequence estimation unit 50.

In this manner, the amplitude phase estimation unit 22 repeats the processes of the path amplitude phase estimation unit 51, the path power calculation unit 52, and the power reference path selection unit 53 by predetermined times. Therefore, the amplitude and phase estimated by the path amplitude phase estimation unit 51 are adaptively adjusted and output as path amplitude phase values. In addition, a detailed configuration of the path amplitude phase estimation unit 51 is separately described in detail.

Figure 9:
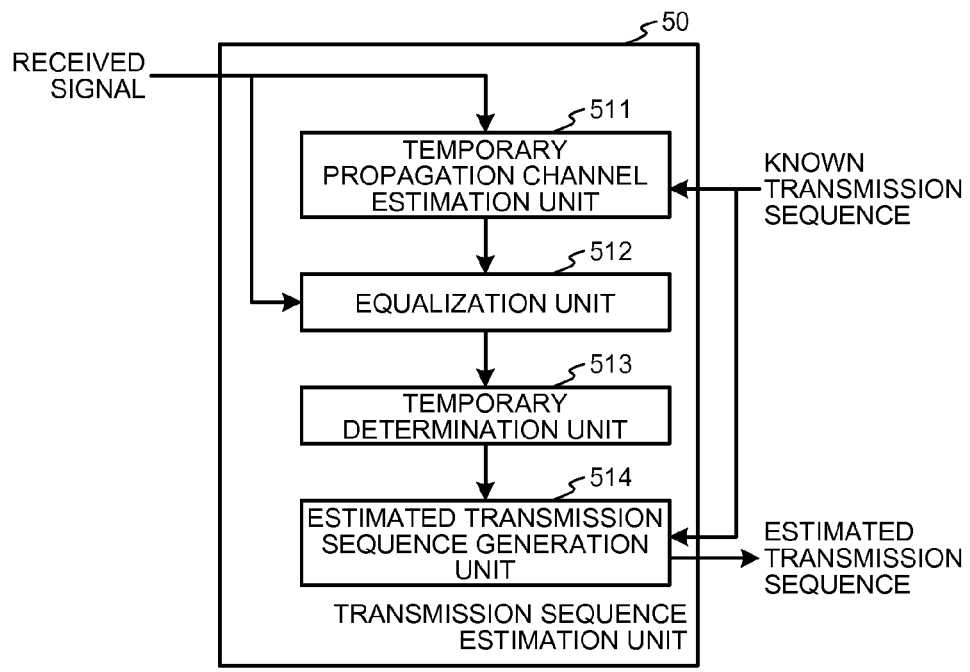
FIG. 9 is a block diagram illustrating a configuration of a transmission sequence estimation unit illustrated in FIG. 8.

Next, a configuration of the transmission sequence estimation unit 50 illustrated in FIG. 8 is described with reference to FIG. 9. FIG. 9 is a block diagram illustrating a configuration of the transmission sequence estimation unit 50 illustrated in FIG. 8. As illustrated in FIG. 9, the transmission sequence estimation unit 50 includes a temporary propagation channel estimation unit 511, an equalization unit 512, a temporary determination unit 513, and an estimated transmission sequence generation unit 514.

The temporary propagation channel estimation unit 511 determines a temporary propagation channel estimation value of a signal propagating through a plurality of the paths PT(0) to PT(τ) by using the received signal and the known transmission sequence. The equalization unit 512 performs an equalization process on the received signal by using the temporary propagation channel estimation value estimated by the temporary propagation channel estimation unit 511. The temporary determination unit 513 temporarily determines the output from the equalization unit 512. The estimated transmission sequence generation unit 514 generates an estimated transmission sequence by using the output of the temporary determination unit 513 and the known transmission sequence.

Figure 10:
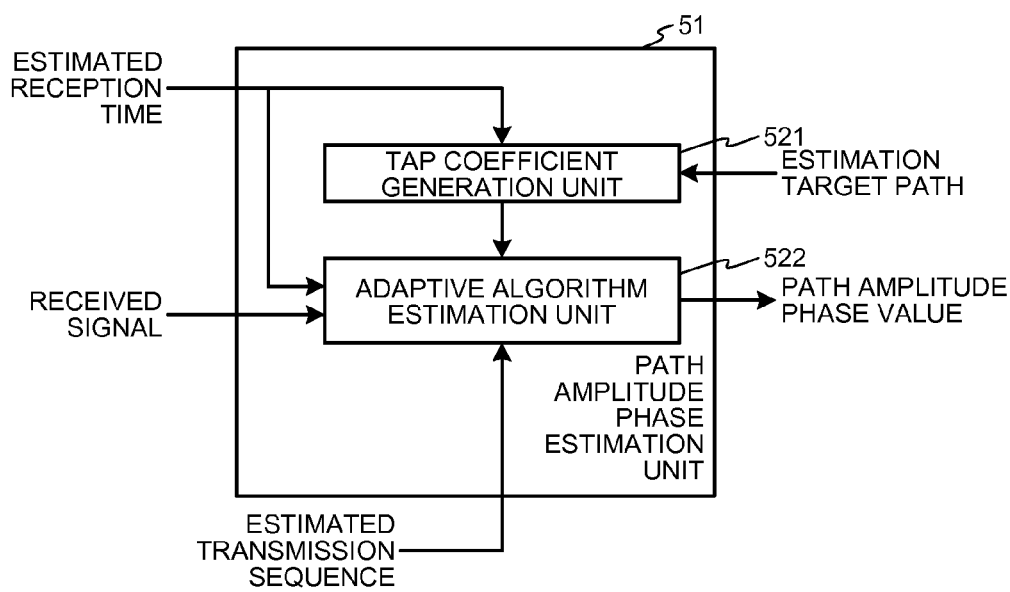
FIG. 10 is a block diagram illustrating a configuration of a path amplitude phase estimation unit illustrated in FIG. 8.

Next, a configuration of the path amplitude phase estimation unit 51 illustrated in FIG. 8 is described with reference to FIG. 10. FIG. 10 is a block diagram illustrating a configuration of the path amplitude phase estimation unit 51 illustrated in FIG. 8. As illustrated in FIG. 10, the path amplitude phase estimation unit 51 includes a tap coefficient generation unit 521 and the adaptive algorithm estimation unit 522.

The tap coefficient generation unit 521 generates a propagation channel estimation value output to the adaptive algorithm estimation unit 522 based on the estimated reception time and the estimation target path. The adaptive algorithm estimation unit 522 inputs the output from the tap coefficient generation unit 521, the received signal, and the estimated transmission sequence to the adaptive algorithm to operate the adaptive algorithm, so that the adaptive algorithm estimation unit 522 estimates the amplitude and phase of the signal propagating through the estimation target path at the estimated reception time as a propagation channel estimation value (path amplitude phase value) of the estimation target path. In addition, a well-known algorithm such as an LMS algorithm and an RLS algorithm may be employed as an adaptive algorithm.

Figure 11:
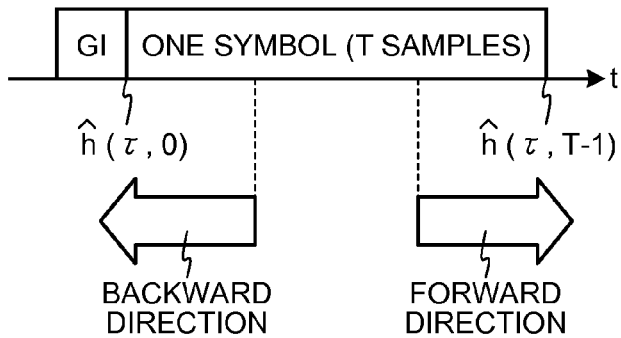
FIG. 11 is a view for explaining an example of operations of an adaptive algorithm of an adaptive algorithm estimation unit.

Herein, operations of the adaptive algorithm of the adaptive algorithm estimation unit 522 are described. FIG. 11 is a view for explaining an example of an operation of the adaptive algorithm of the adaptive algorithm estimation unit 522. In addition, with reference to FIG. 11, described is the case where the front and rear end time t=0 and t=T−1 in the current symbol (T sample signal) of the signal propagating through the estimation target path are determined as estimated reception times by the estimated reception time determination unit 21.

As illustrated in FIG. 11, in general, a guide interval GI is inserted in the front end portion of one symbol, that is, T sample signals. In addition, the guide interval denotes an interval of a rear end portion of a predetermined symbol which is copied in a front end portion of the symbol in the time domain. In the case where the propagation channel estimation value of the estimated reception time t=0 of the front end of the current symbol is estimated, the adaptive algorithm estimation unit 522 operates the adaptive algorithm in the direction of going backward from the meantime of the current symbol in the time domain, that is, in the direction of the guide interval GI. On the other hand, in the case where the propagation channel estimation value of the estimated reception time t=T−1 of the rear end of the current symbol is estimated, the adaptive algorithm estimation unit 522 operates the adaptive algorithm in the direction of going forward from the meantime of the current symbol in the time domain, that is, in the direction opposite to the direction of the guide interval GI. Therefore, the convergence of the adaptive algorithm can be performed at a high speed.

Figure 12:
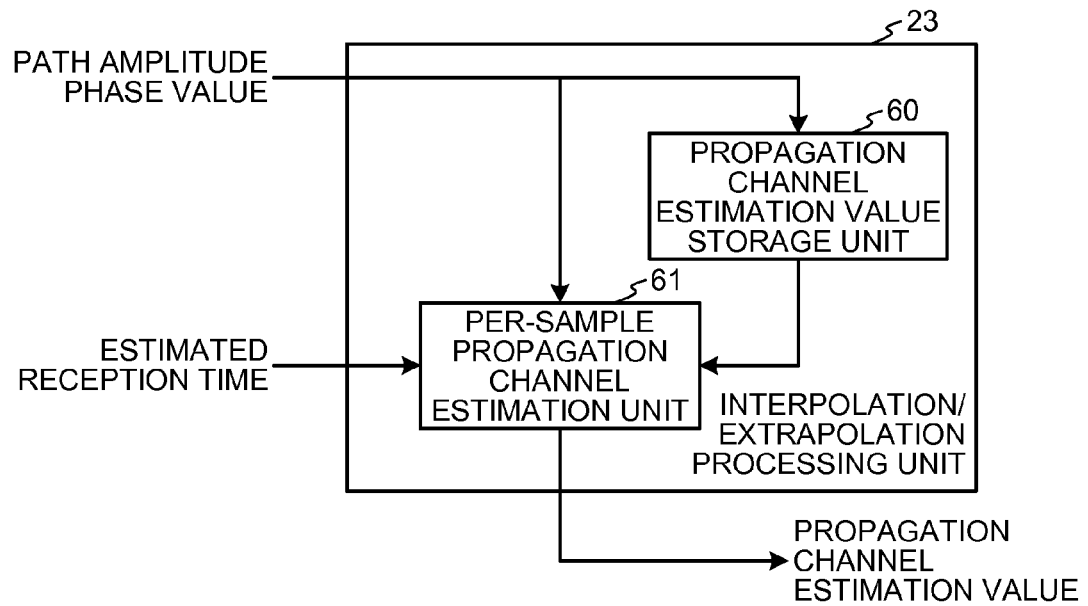
FIG. 12 is a block diagram illustrating a configuration of an interpolation/extrapolation processing unit illustrated in FIG. 3.

Next, a configuration of the interpolation/extrapolation processing unit 23 illustrated in FIG. 3 is described with reference to FIG. 12. FIG. 12 is a block diagram illustrating a configuration of the interpolation/extrapolation processing unit 23 illustrated in FIG. 3. As illustrated in FIG. 12, the interpolation/extrapolation processing unit 23 includes a propagation channel estimation value storage unit 60 and a per-sample propagation channel estimation unit 61.

The propagation channel estimation value storage unit 60 stores the path amplitude phase value output from the amplitude phase estimation unit 22, that is, the propagation channel estimation value of the estimation target path.

The per-sample propagation channel estimation unit 61 performs the interpolation/extrapolation process by using the estimated reception time and the propagation channel estimation value of the estimation target path, if needed, together with the propagation channel estimation value of the estimation target path stored in the propagation channel estimation value storage unit 60. More specifically, the per-sample propagation channel estimation unit 61 estimates the propagation channel estimation value at the time other than the estimated reception time of the signal propagating through the estimation target path by performing the interpolation/extrapolation process, so that the propagation channel estimation value of each of the sample signals included in one symbol of the signal propagating through the estimation target path is estimated. In addition, various interpolation/extrapolation processes such as a linear interpolation/extrapolation process or a curved interpolation/extrapolation process can be employed as an interpolation/extrapolation process.

Figure 13:
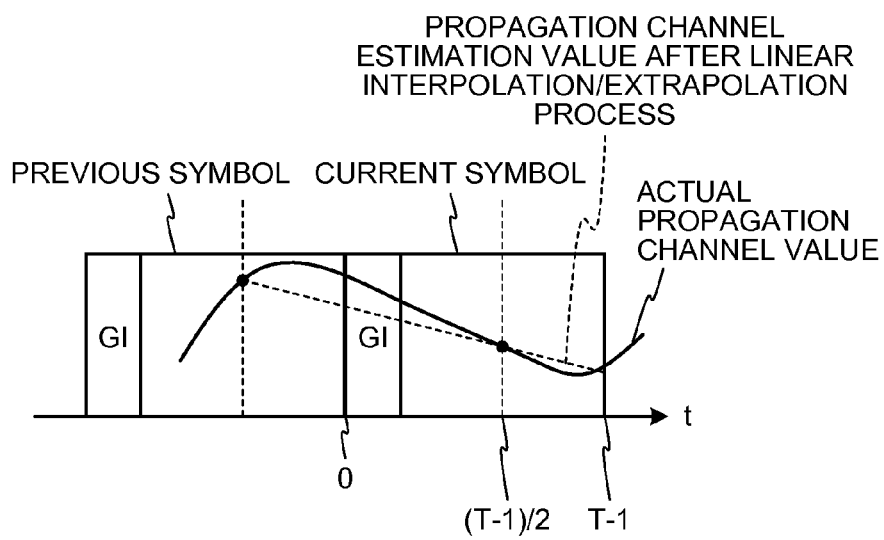
FIG. 13 is a view for explaining an example of operations of an interpolation/extrapolation process of a per-sample propagation channel estimation unit.

Herein, a procedure of the interpolation/extrapolation process in the per-sample propagation channel estimation unit 61 is described with reference to FIGS. 13 and 14. FIG. 13 is a view for explaining an example of an operation of the interpolation/extrapolation process of the per-sample propagation channel estimation unit 61 in the case where the estimated reception time determination unit 21 determines the time at the center of the current symbol as an estimated reception time.

As illustrated in FIG. 13, in the case where the estimated reception time is the time t=(T−1)/2 at the center of the current symbol, first, the per-sample propagation channel estimation unit 61 reads the propagation channel estimation value of the estimation target path in the previous symbol from the propagation channel estimation value storage unit 60.

Subsequently, the per-sample propagation channel estimation unit 61 performs the linear interpolation/extrapolation process by using the propagation channel estimation value of the estimation target path in the previous symbol and the propagation channel estimation value of the estimation target path in the current symbol. In other words, the per-sample propagation channel estimation unit 61 generates a straight line connecting the propagation channel estimation value of the time t=(T−1)/2 at the center of the previous symbol and the propagation channel estimation value of the time t=(T−1)/2 at the center of the current symbol and estimates the propagation channel estimation values of all sample signals included in one symbol (T sample signals). In other words, an actual propagation channel value is allowed to be approximate to the straight line generated by the per-sample propagation channel estimation unit 61.

Figure 14:
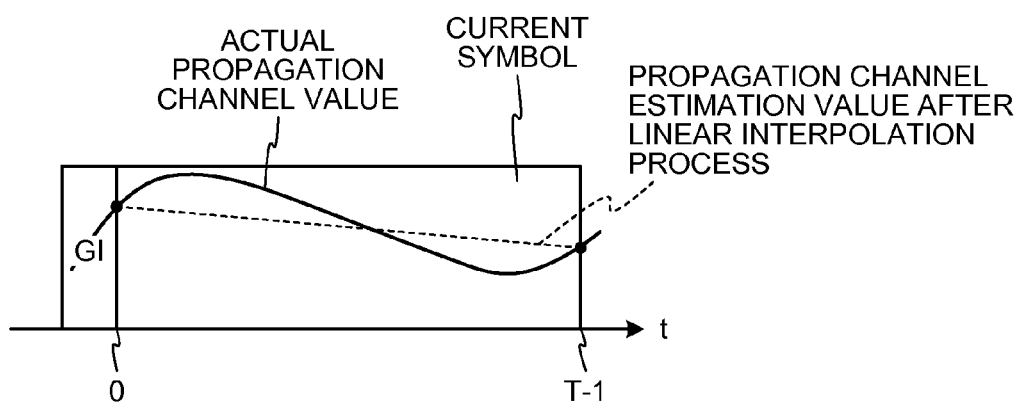
FIG. 14 is a view for explaining an example of operations of an interpolation/extrapolation process of a per-sample propagation channel estimation unit.

FIG. 14 is a view for explaining an example of an operation of the interpolation/extrapolation process of the per-sample propagation channel estimation unit 61 in the case where the estimated reception time determination unit 21 determines the front and rear end times in the current symbol as an estimated reception time.

As illustrated in FIG. 14, in the case where the estimated reception times are t=0 and t=T−1 at the front and rear ends of the current symbol, the per-sample propagation channel estimation unit 61 performs the linear interpolation/extrapolation process by using the propagation channel estimation value of the estimation target path in the current symbol. In other words, the per-sample propagation channel estimation unit 61 generates a straight line connecting the propagation channel estimation values of times t=0 and t=T−1 at the front and rear ends of the current symbol and estimates the propagation channel estimation values of all sample signals included in one symbol (T sample signals). In other words, an actual propagation channel value is allowed to be approximate to the straight line generated by the per-sample propagation channel estimation unit 61.

Figure 15:
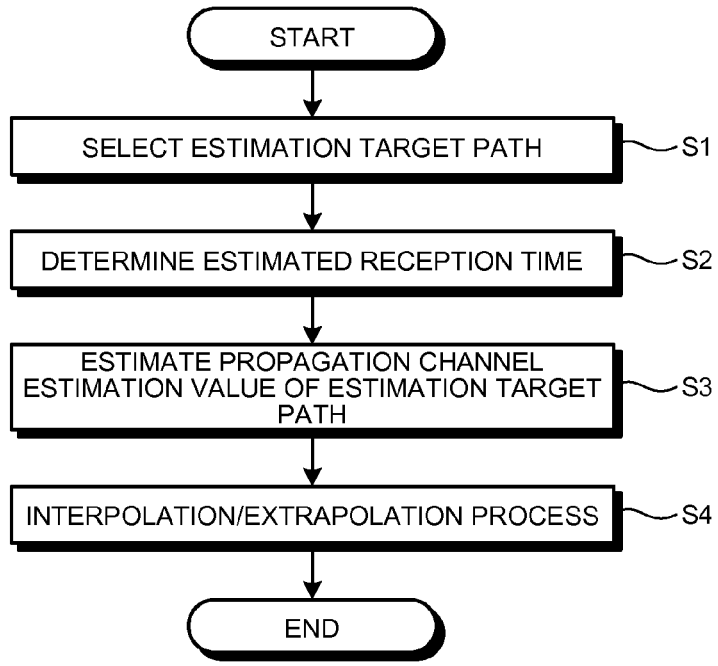
FIG. 15 is a flowchart illustrating a propagation channel estimation process of a propagation channel estimation apparatus according to an embodiment.

Next, a propagation channel estimation process of the propagation channel estimation apparatus 11 according to the embodiment is described with reference to FIG. 15. FIG. 15 is a flowchart illustrating the propagation channel estimation process of the propagation channel estimation apparatus 11 according to the embodiment.

As illustrated in FIG. 15, the path selection unit 20 of the propagation channel estimation apparatus 11 selects the estimation target path among a plurality of the paths PT(0) to PT(τ) based on a path characteristic value (that is, the aforementioned power or probability) of each path from the received signal (Step S1). In addition, the estimated reception time determination unit 21 determines the estimated reception time (Step S2). Furthermore, the processes of Step S1 and Step S2 may be simultaneously performed.

The amplitude phase estimation unit 22 estimates the amplitude and phase of the signal propagating through the estimation target path selected in Step S1 at the estimated reception time determined in Step S2 as a propagation channel estimation value of the estimation target path (Step S3).

The interpolation/extrapolation processing unit 23 performs the interpolation/extrapolation process using the propagation channel estimation value of the estimation target path estimated in Step S3, so that the propagation channel estimation value at the time other than the estimated reception time of the signal propagating through the estimation target path is estimated (Step S4).

As described above, in the embodiment, the path for estimation of the propagation channel estimation value is selected in advance among a plurality of the paths; the propagation channel estimation value of the path is first calculated, and after that, the interpolation/extrapolation process is performed by using the calculation result. Therefore, when the propagation channel is estimated through an adaptive algorithm, even in an environment of the propagation channel of which a change is fast due to an frequency error between the transmitter and the receiver or Doppler shift associated with movement of the transmitter and the receiver, it is possible to obtain the propagation channel estimation value at a high speed with high accuracy.

In addition, since the propagation channel estimation value of each of the sample signals included in one symbol of the signal propagating through the estimation target path can be estimated at a high speed with high accuracy, the estimated propagation channel estimation value can be effectively used for the equalization process on the received signal in the equalizer 10, so that high reception performance of the receiver can be maintained.

For example, the estimated propagation channel estimation value can be used for an equalization process of chip interference in a communication using a spectrum spread method and an equalization process of inter-symbol interference or inter-carrier interference in communication using an OFDM method. More specifically, the equalization process of the chip interference is performed as follows.

$$\tilde{x} = \frac{\hat{H}^H}{\hat{H} + \sigma^2 I} y \qquad (4)$$

where y denotes a time sequence of a received signal; σ denotes a noise power estimation value; and $\hat{H}$ denotes a propagation channel matrix. Herein, the propagation channel matrix is defined, for example, by the following equation using a propagation channel estimation value of each of sample signals included in one symbol (T sample signals) of a signal propagating through an estimation target path.

$$\hat{H} = \begin{bmatrix} \hat{h}(0,0) & \hat{h}(T-1,0) & \cdots & \hat{h}(1,0) \\ \hat{h}(1,1) & \hat{h}(0,1) & \ddots & \hat{h}(2,1) \\ \vdots & \ddots & \ddots & \vdots \\ \hat{h}(T-1,T-1) & \hat{h}(T-2,T-1) & \cdots & \hat{h}(0,T-1) \end{bmatrix} \qquad (5)$$

where $\hat{h}(\tau, t)$ denotes a propagation channel estimation value.

In addition, the equalization process of inter-carrier interference is performed as follows.

$$\tilde{x} = IFFT\left[\frac{FFT[y]FFT[\hat{x}]}{FFT[\hat{H}\hat{x}]}\right] \quad (6)$$

In addition, the equalization process of inter-symbol interference is performed as follows.

$$\tilde{x} = IFFT\left[\frac{FFT[y - \hat{H}_p\hat{x}_p + \hat{H}_p\hat{x}_c]}{FFT[\hat{H}]}\right] \quad (7)$$

$$\hat{H} = \hat{H}_p + \hat{H}_c \quad (8)$$

where $\hat{x}_p(t)$ denotes a transmitted signal replica of a previous symbol; $\hat{H}_p$ denotes a propagation channel matrix corresponding to the transmitted signal replica of the previous symbol; $\hat{x}_c(t)$ denotes a transmitted signal replica of a current symbol; and $\hat{H}_c$ denotes a propagation channel matrix corresponding to the transmitted signal replica of the current symbol.

Figure 16:
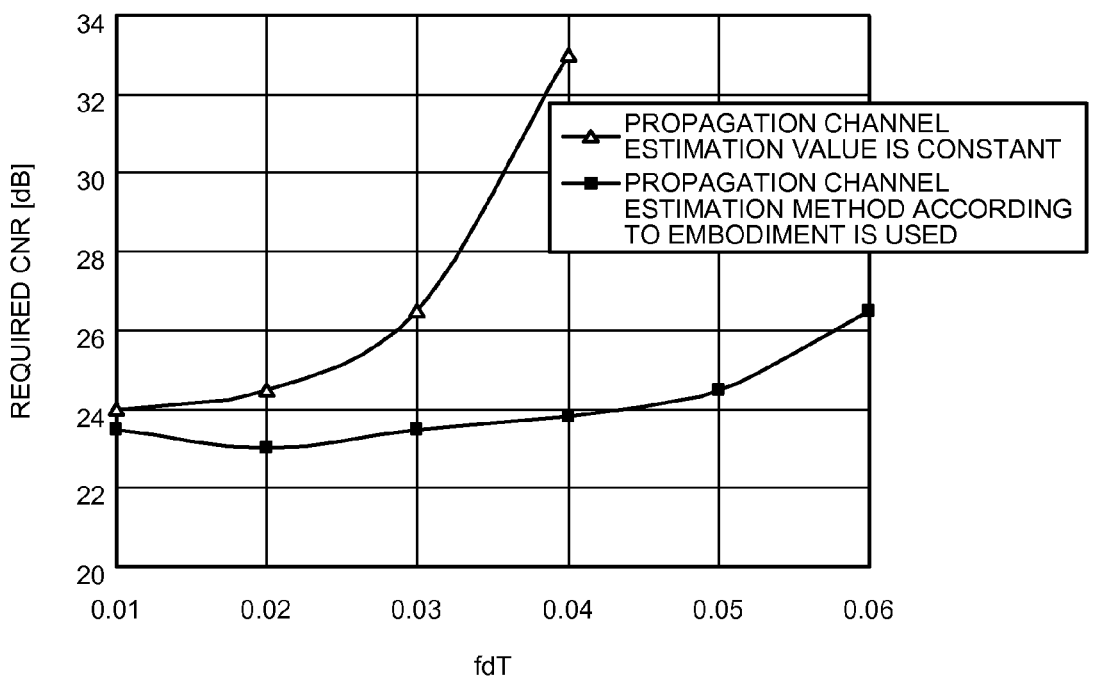
FIG. 16 is a view illustrating an example of a result of simulation using a propagation channel estimation apparatus according to an embodiment.

Next, effects (improvement of receiving performance of the receiver) of the aforementioned embodiment are verified with reference to FIG. 16. FIG. 16 is a view illustrating an example of a result of simulation using the propagation channel estimation apparatus 11 according to the embodiment. In addition, in FIG. 16, the horizontal axis is represented by a maximum Doppler frequency fdT normalized with the number T of sample signals in one symbol, and the vertical axis is represented by a Carrier vs. Noise Ratio (CNR) required to obtain a Bit Error Ratio (BER)=2×10$^{-4}$. In addition, in FIG. 16, a plot of white triangular marks represents a required CNR in the case where the propagation channel estimation value in one symbol (T sample signals) is assumed to be constant, and a plot of black rectangular marks represents a required CNR in the case where the propagation channel estimation value is estimated by using the propagation channel estimation method according to the embodiment.

As illustrated in FIG. 16, in the case where the propagation channel estimation value is assumed to be constant (the plot of white triangular marks), the required CNR for fdT=0.04 is increased up to about 33 dB. On the contrary, in the case where the propagation channel estimation method according to the embodiment is used (the plot of black rectangular marks), the required CNR for fdT=0.04 is maintained to be about 24 dB. It can be understood from the result that, by using the propagation channel estimation method according to the embodiment, high reception performance of the receiver can be maintained even in an environment where the fdT is relatively high, that is, even in an environment of the propagation channel where fading change in one symbol (T sample signals) is relatively fast.

Hereinbefore, although the embodiments of the present invention are described, the present invention may be implemented as various other embodiments within the spirit of the present invention disclosed in the claims.

Figure 17:
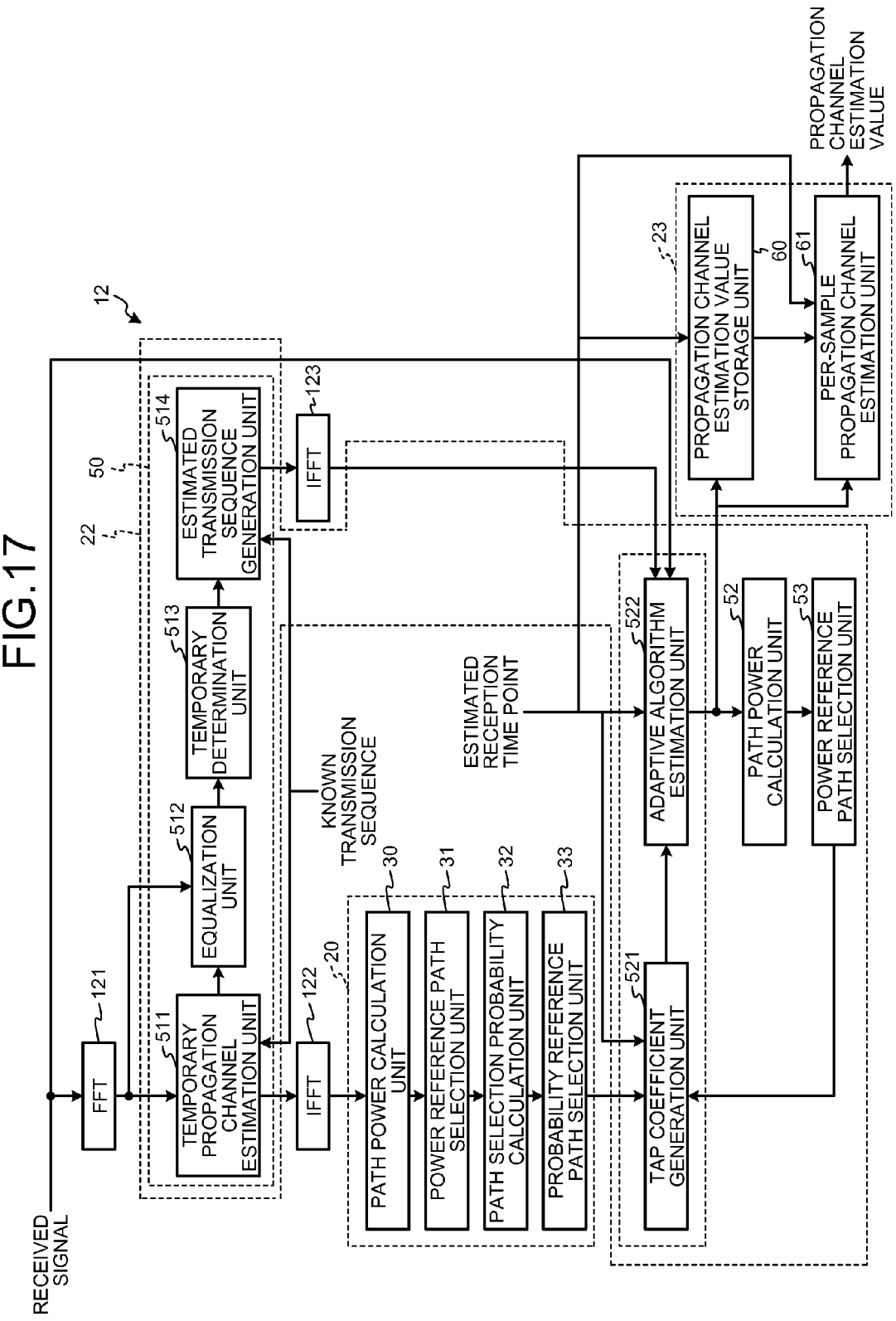
FIG. 17 is a block diagram illustrating a configuration of an OFDM propagation channel estimation apparatus employing a propagation channel estimation method according to an embodiment.

For example, the present invention can be very suitably used for a propagation channel estimation apparatus using an OFDM communication method. FIG. 17 is a block diagram illustrating a configuration of the OFDM propagation channel estimation apparatus employing the propagation channel estimation method according to the aforementioned embodiment. In addition, in FIG. 17, the time at the center of the current symbol is used as an estimated reception time. In addition, the same elements as those of the aforementioned embodiment are denoted by the same reference numerals, and the description thereof is omitted.

As illustrated in FIG. 17, an OFDM propagation channel estimation apparatus 12 includes the path selection unit 20, the amplitude phase estimation unit 22, and the interpolation/extrapolation processing unit 23 as the same configuration as that of the aforementioned embodiment. The OFDM propagation channel estimation apparatus 12 further includes an FFT unit 121, an IFFT unit 122, and an IFFT unit 123.

The FFT unit 121 performs an FFT process (Fourier Transform process) on a received signal in the time domain to transform the received signal into a signal in the frequency domain. The temporary propagation channel estimation unit 511 estimates a temporary propagation channel estimation value by multiplying the output of the FFT unit 121 with a known transmission sequence and performing interpolation in the subcarrier direction. The equalization unit 512 performs an equalization process by multiplying the output of the FFT unit 121 with the temporary propagation channel estimation value estimated by the temporary propagation channel estimation unit 511. The temporary determination unit 513 temporarily determines the output of the equalization unit 512. The estimated transmission sequence generation unit 514 generates an estimated transmission sequence by using the output of the temporary determination unit 513 and the known transmission sequence. The IFFT unit 123 performs an Inverse Fourier Transform process (IFFT) process) on the estimated transmission sequence generated by the estimated transmission sequence generation unit 514 to transform the estimated transmission sequence into a signal in the time domain. The estimated transmission sequence transformed in the time domain is output to the adaptive algorithm estimation unit 522.

The IFFT unit 122 applies the IFFT process on the output of the temporary propagation channel estimation unit 511 to calculate the temporary propagation channel estimation value of each delay time, that is, the temporary propagation channel estimation value of each path and inputs the temporary propagation channel estimation value to the path selection unit 20.

Figure 18:
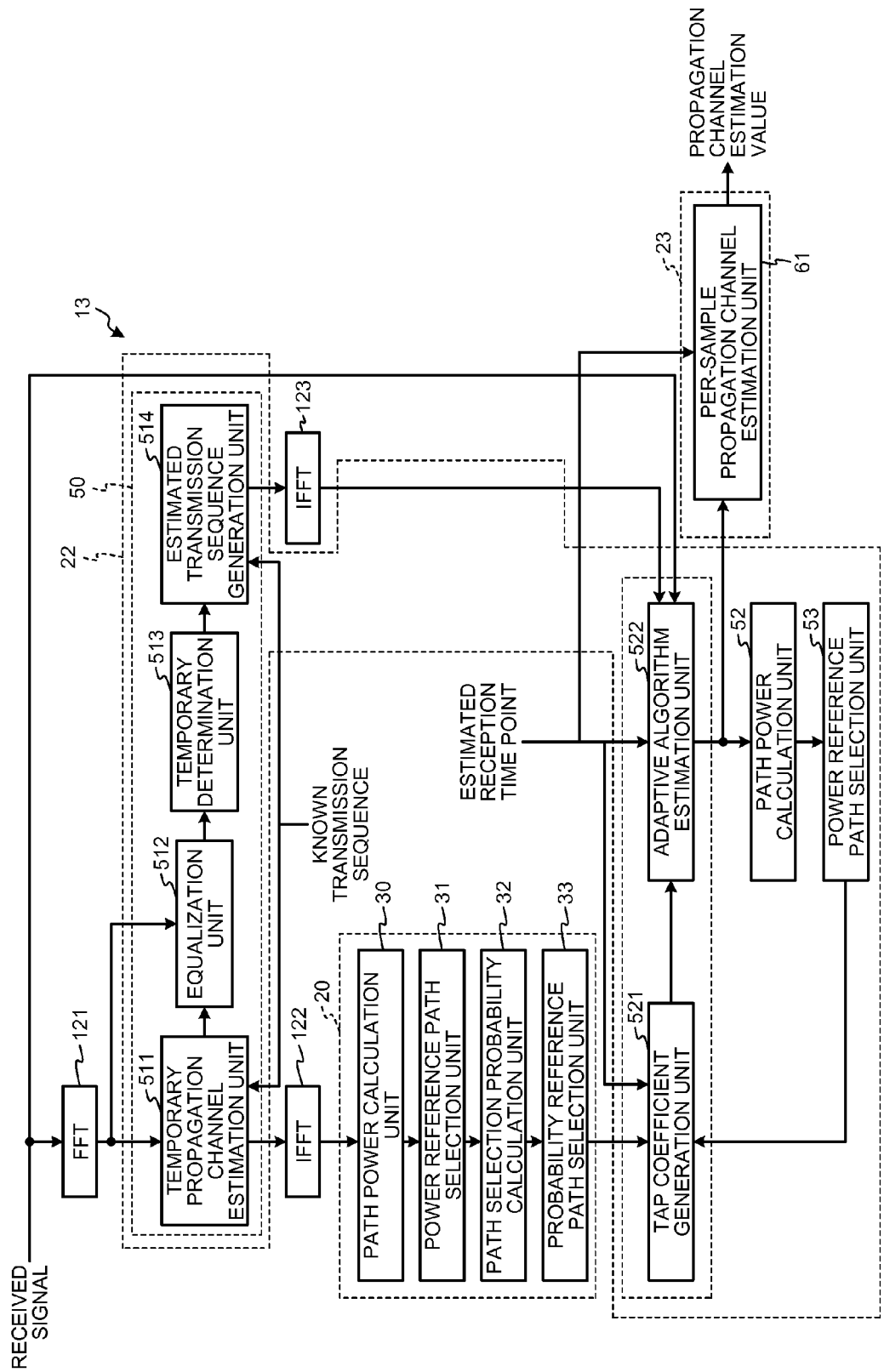
FIG. 18 is a block diagram illustrating another configuration of an OFDM propagation channel estimation apparatus illustrated in FIG. 17.

FIG. 18 is a block diagram illustrating another configuration of the OFDM propagation channel estimation apparatus 12 illustrated in FIG. 17. In addition, in FIG. 18, the times at the front and rear ends of the current symbol are used as estimated reception times. In addition, the same elements as those described in FIG. 17 are denoted by the same reference numerals, and the description thereof is omitted.

An OFDM propagation channel estimation apparatus 13 illustrated in FIG. 18 is different from the OFDM propagation channel estimation apparatus 12 illustrated in FIG. 17 in that the propagation channel estimation value storage unit 60 is not provided. Since the estimated reception times are the times at the front and rear ends of the current symbol, when the per-sample propagation channel estimation unit 61 performs the interpolation/extrapolation process, the propagation channel estimation value of the estimation target path of the previous symbol is not used, so that the propagation channel estimation value storage unit 60 needs not to be provided. Therefore, the configuration of the OFDM propagation channel estimation apparatus 13 can be simplified in comparison with that of the OFDM propagation channel estimation apparatus 12 illustrated in FIG. 17.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A propagation channel estimation apparatus used in a receiver that receives a signal transmitted from a transmitter through a plurality of paths, the propagation channel estimation apparatus comprising:
   a path selection unit that selects an estimation target path, which is a path to be used to estimate a propagation channel estimation value, among the plurality of paths that receives the signal transmitted by the transmitter based on a predetermined characteristic value of each path;
   an estimated reception time determination unit that determines an estimated reception time that is a time at which a signal as a target of estimation of the propagation channel estimation value among signals propagating through the estimation target path is received;
   an amplitude phase estimation unit that estimates an amplitude and a phase of the signal propagating through the estimation target path at the estimated reception time as a propagation channel estimation value of the estimation target path; and
   an interpolation/extrapolation processing unit that performs an interpolation/extrapolation process using the propagation channel estimation value of the estimation target path to estimate the propagation channel estimation value at a time other than the estimated reception time of the signal propagating through the estimation target path,
   wherein the estimated reception time determination unit includes a time change amount detection unit that detects a time change amount between the propagation channel estimation value of each of sample signals included in a previous symbol of the signal propagating through the estimation target path and the propagation channel estimation value of each of the sample signals included in a current symbol of the signal propagating through the estimation target path;
   a time number determination unit that determines the number of estimated reception times according to a size of the time change amount; and
   a time final determination unit that determines the estimated reception time by the number of the determined estimated reception times.

2. The propagation channel estimation apparatus according to claim 1, wherein the path selection unit includes
   a path power calculation unit that calculates a power of each path from a signal received through the plurality of paths as the predetermined characteristic value; and
   a power reference path selection unit that selects a path having the calculated power equal to or larger than a predetermined threshold value, from among the plurality of paths as an estimation target path.

3. The propagation channel estimation apparatus according to claim 1, wherein the path selection unit includes
   a path power calculation unit that calculates a power of each path from a signal received through the plurality of paths as the predetermined characteristic value;
   a power reference path selection unit that selects an effective power path, which is a path having the calculated power equal to or larger than a predetermined threshold value, from among the plurality of paths;
   a path selection probability calculation unit that calculates a probability of a case where each path is to be selected as the effective power path by the power reference path selection unit as the predetermined characteristic value; and
   a probability reference path selection unit that selects a path having the calculated probability equal to or larger than a predetermined threshold value as the estimation target path.

4. The propagation channel estimation apparatus according to claim 1,
   wherein the receiver is an orthogonal frequency division multiplexing (OFDM) receiver which performs communication in an OFDM communication method,
   wherein the estimated reception time determination unit determines a time when a sample signal as an object of estimation of the propagation channel estimation value is to be received from among sample signals included in one symbol of the signal propagating the estimation target path as the estimated reception time, and
   wherein the interpolation/extrapolation processing unit estimates the propagation channel estimation value at the time other than the estimated reception time, so that the propagation channel estimation value of each of the sample signals included in one symbol of the signal propagating through the estimation target path is estimated.

5. A receiver that receives a signal transmitted from a transmitter through a plurality of paths, the receiver comprising:
   a path selection unit that selects an estimation target path, which is a path to be used to estimate a propagation channel estimation value, among the plurality of paths that receives the signal transmitted by the transmitter based on a predetermined characteristic value of each path;
   an estimated reception time determination unit that determines an estimated reception time that is a time at which a signal as a target of estimation of the propagation channel estimation value among signals propagating through the estimation target path is received;
   an amplitude phase estimation unit that estimates an amplitude and a phase of the signal propagating through the estimation target path at the estimated reception time as a propagation channel estimation value of the estimation target path; and
   an interpolation/extrapolation processing unit that performs an interpolation/extrapolation process using the propagation channel estimation value of the estimation target path to estimate the propagation channel estimation value at a time other than the estimated reception time of the signal propagating through the estimation target path, wherein
   the estimated reception time determination unit includes a time change amount detection unit that detects a time change amount between the propagation channel estimation value of each of sample signals included in a previous symbol of the signal propagating through the estimation target path and the propagation channel estimation value of each of the sample signals included in a current symbol of the signal propagating through the estimation target path;
   a time number determination unit that determines the number of estimated reception times according to a size of the time change amount; and a time final determination unit that determines the estimated reception time by the number of the determined estimated reception times.

6. The receiver according to claim 5, wherein the path selection unit includes
a path power calculation unit that calculates a power of each path from a signal received through the plurality of paths as the predetermined characteristic value; and
a power reference path selection unit that selects a path having the calculated power equal to or larger than a predetermined threshold value, from among the plurality of paths as an estimation target path.

7. The receiver according to claim 5, wherein the path selection unit includes
a path power calculation unit that calculates a power of each path from a signal received through the plurality of paths as the predetermined characteristic value;
a power reference path selection unit that selects an effective power path, which is a path having the calculated power equal to or larger than a predetermined threshold value, from among the plurality of paths;
a path selection probability calculation unit that calculates a probability of a case where each path is to be selected as the effective power path by the power reference path selection unit as the predetermined characteristic value; and
a probability reference path selection unit that selects a path having the calculated probability equal to or larger than a predetermined threshold value as the estimation target path.

8. The receiver according to any one of claims 5 to 7,
wherein the receiver is an orthogonal frequency division multiplexing (OFDM) receiver which performs communication in an OFDM communication method,
wherein the estimated reception time determination unit determines a time when a sample signal as an object of estimation of the propagation channel estimation value is to be received among sample signals included in one symbol of the signal propagating the estimation target path as the estimated reception time, and
wherein the interpolation/extrapolation processing unit estimates the propagation channel estimation value at the time other than the estimated reception time, so that the propagation channel estimation value of each of the sample signals included in one symbol of the signal propagating through the estimation target path is estimated.

9. A propagation channel estimation method performed in a receiver that receives a signal transmitted from a transmitter through a plurality of paths, the propagation channel estimation method comprising:
selecting an estimation target path, which is a path to be used to estimate a propagation channel estimation value, among the plurality of paths that receives the signal transmitted by the transmitter based on a predetermined characteristic value of each path;
determining an estimated reception time that is a time at which a signal as a target of estimation of the propagation channel estimation value among signals propagating through the estimation target path is received;
estimating an amplitude and a phase of the signal propagating through the estimation target path at the estimated reception time as a propagation channel estimation value of the estimation target path; and
performing an interpolation/extrapolation process using the propagation channel estimation value of the estimation target path to estimate the propagation channel estimation value at a time other than the estimated reception time of the signal propagating through the estimation target path,
wherein the determining includes detecting a time change amount between the propagation channel estimation value of each of sample signals included in a previous symbol of the signal propagating through the estimation target path and the propagation channel estimation value of each of the sample signals included in a current symbol of the signal propagating through the estimation target path;
determining the number of estimated reception times according to a size of the time change amount; and
determining the estimated reception time by the number of the determined estimated reception times.

10. The propagation channel estimation method according to claim 9, wherein the selecting includes
calculating a power of each path from a signal received through the plurality of paths as the predetermined characteristic value; and
selecting a path having the calculated power equal to or larger than a predetermined threshold value, among the plurality of paths as an estimation target path.

11. The propagation channel estimation method according to claim 9, wherein the selecting includes
calculating a power of each path from a signal received through the plurality of paths as the predetermined characteristic value;
selecting an effective power path, which is a path having the calculated power equal to or larger than a predetermined threshold value, among the plurality of paths;
calculating a probability of a case where each path is to be selected as the effective power path by the power reference path selection unit as the predetermined characteristic value; and
selecting a path having the calculated probability equal to or larger than a predetermined threshold value as the estimation target path.

12. The propagation channel estimation method according to claim 9,
wherein the receiver is an orthogonal frequency division multiplexing (OFDM) receiver which performs communication in an OFDM communication method,
wherein the determining includes determining a time when a sample signal as an object of estimation of the propagation channel estimation value is to be received from among sample signals included in one symbol of the signal propagating the estimation target path as the estimated reception time, and
wherein the performing the interpolation/extrapolation process includes estimating the propagation channel estimation value at the time other than the estimated reception time, so that the propagation channel estimation value of each of the sample signals included in one symbol of the signal propagating through the estimation target path is estimated.

* * * * *